United States Patent [19]

Tiegs

[11] Patent Number: 5,207,958
[45] Date of Patent: May 4, 1993

[54] PRESSURELESS SINTERING OF WHISKER-TOUGHENED CERAMIC COMPOSITES

[75] Inventor: Terry N. Tiegs, Lenoir City, Tenn.

[73] Assignee: Martin Marietta Energy Systems, Inc., Oak Ridge, Tenn.

[21] Appl. No.: 789,390

[22] Filed: Nov. 6, 1991

Related U.S. Application Data

[63] Continuation of Ser. No. 579,506, Sep. 10, 1990, abandoned, which is a continuation of Ser. No. 340,625, Apr. 9, 1989, abandoned.

[51] Int. Cl.$^5$ ............................................. C04B 35/10
[52] U.S. Cl. ........................................ 264/65; 264/36; 501/89
[58] Field of Search ................... 264/65, 56; 501/89

[56] References Cited

U.S. PATENT DOCUMENTS

| | | | |
|---|---|---|---|
| 4,543,345 | 9/1985 | Wei | 264/65 |
| 4,652,413 | 3/1987 | Tiegs | 264/66 |
| 4,839,316 | 6/1989 | Tiegs | 501/89 |
| 4,956,316 | 9/1990 | Sawyer | 501/89 |

OTHER PUBLICATIONS

"Sintered Al$_2$O$_3$–SiC–Whisker Composite," Am. Ceram. Soc. Bull. 66 (2) 339–42 (1987).
Ceramic Technology for Advanced Heat Engines Project Semi-annual Prog. Report for Apr. 1987 through Sep. 1987.
Oak Ridge National Laboratory Report TM-10705, pp. 89–94, issued Apr. 20, 1988.
Processing of Pressureless-Sintered SiC Whisker-Reinforced Al$_2$O$_3$ Composites, S. J. Barclay et al, J. of Mat'l Sci., 22 4403–4406 (1987).
Suspension Processing of Al$_2$O$_3$/SiC Whisker Composites M. D. Sacks et al, J. Am. Ceram. Soc. 71 (5) 370–79 (1988).
Pressureless Sintering of SiC Whisker-Reinforced Composites, M. D. Sacks, et al, Ceramic Engineering & Sci. Proc., 9 (7–8) pp. 741–754 (1988).

*Primary Examiner*—James Derrington
*Attorney, Agent, or Firm*—J. Donald Griffin; Harold W. Adams

[57] ABSTRACT

A pressureless sintering method is disclosed for use in the production of whisker-toughened ceramic composites wherein the sintered density of composites containing up to about 20 vol. % SiC whiskers is improved by reducing the average aspect ratio of the whiskers to from about 10 to about 20. Sintering aids further improve the density, permitting the production of composites containing 20 vol. % SiC with sintered densities of 94% or better of theoretical density by a pressureless sintering method.

7 Claims, 3 Drawing Sheets

PRESSURELESS SINTERING OF WHISKER-TOUGHENED CERAMIC COMPOSITES

This application is a continuation of application Ser. No. 579,506 filed Sep. 10, 1990, now abandoned, which is a continuation of parent application Ser. No. 340,625 filed Apr. 19, 1989, now abandoned.

The U.S. government has rights in this invention pursuant to contract No. DE-AC05-840R21400 awarded by U.S. Department of Energy contract with Martin Marietta Energy Systems, Inc.

The present invention relates generally to methods for the preparation of whisker-toughened ceramic composites and more particularly relates to methods of pressureless sintering of such composites.

It is known from the Assignee's U.S. Pat. No. 4,652,413 entitled "Method for Preparing Configured Silicon Carbide Whisker-Reinforced Alumina Ceramic Articles" that whisker-toughened ceramics may be produced by a pressureless sintering process to enable the fabrication of articles with relatively complicated geometries having near final dimensions. This development has significantly expanded the range of configuration of articles incorporating whisker-toughened ceramic composites over the previous hot pressing techniques which were limited to the fabrication of relatively simple shapes that could be converted to complex shapes only through extensive post-formation machining processes.

In accordance with the above-referenced patent, the disclosure of which is incorporated herein by reference, ceramic composites produced by pressureless sintering must contain a SiC whisker concentration of no more than 10 vol. % in order to achieve desirable sintered densities of about 94% of the theoretical density. It was found that composites containing greater than 10 vol. % SiC whiskers may not be sinterable without pressure assistance. In particular, the tests showed that composites incorporating 20 vol. % SiC whiskers achieved densities no greater than about 75% of the theoretical density. This limitation on the permissible concentration of SiC whiskers which may be incorporated into ceramic composites produced by a pressureless sintering process has inhibited full realization of the advantages available through the use of SiC whiskers in items produced from such methods.

It is, therefore, an object of the present invention to provide a method for making whisker-toughened ceramic composites by pressureless sintering.

An additional object of the invention is to provide a pressureless sintering method for the production of whisker-toughened ceramic composites containing up to about 20 vol. % SiC whiskers wherein the composites exhibit improved sintered densities.

Yet another object of the invention is the provision of a pressureless sintering method for use in the production of whisker-toughened ceramic composites incorporating up to about 20 vol. % SiC whiskers wherein the sintered densities are at least about 94% of theoretical.

Still another object of the invention is to provide a pressureless sintering method for whisker-toughened ceramics incorporating alumina and mullite as the ceramic matrix material.

A further object of the invention is the provision of a pressureless sintering method for whisker-toughened ceramics which employs new and beneficial liquid-phase sintering aids.

The foregoing and other objects and advantages are achieved in accordance with the present invention which provides for the production of whisker-toughened ceramic composites containing up to about 20 vol. % SiC whiskers by a pressureless sintering method wherein the composites exhibit improved sintered densities over previous composites produced by pressureless sintering methods incorporating corresponding concentrations of whiskers. The method is applicable to the production of ceramic composites incorporating a ceramic matrix material selected from the class consisting of alumina and mullite, SiC whiskers, and a sintering aid selected from the class consisting of $Y_2O_3$, MgO, $ZrO_2$, $Si_3N_4$ and mixtures thereof. In general, the method comprises forming a homogeneous mixture including up to about 20 vol. % of SiC whiskers with the whiskers having an average aspect ratio (length/diameter) of from about 10 to about 20, a sintering aid selected from the class consisting of $Y_2O_3$, MgO, $ZrO_2$, $Si_3N_4$ and mixtures thereof in a sufficient concentration to provide liquid phase sintering, and a ceramic matrix material selected from the group consisting of alumina and mullite. The mixture is shaped into a preselected configuration at a pressed density in the neighborhood of about 50% of the theoretical density and then heated at essentially atmospheric pressure in an inert atmosphere at a temperature sufficient to effect liquid-phase sintering of the ceramic matrix to provide a self-supporting composite formed of the ceramic matrix material toughened by a dispersed whisker phase therein with an improved sintered density over previous composites produced by pressureless sintering containing corresponding concentrations of SiC whiskers.

Typically, the whiskers in the as-received condition have an average aspect ratio of greater than about 50. It is found that the substantial improvements in sintered densities disclosed herein for 20 vol. % SiC whisker composites are achieved by reducing the aspect ratio to from about 10 to about 20, permitting the production of sintered composites without pressure assistance.

Through an appropriate combination of constituents and concentrations, sintered densities of at least about 94% of the theoretical density are achieved in composites containing up to 20 vol. % SiC whiskers produced by the pressureless sintering method of the invention. For example, in a preferred embodiment, alumina is selected as the matrix material and the whiskers which are in the typical as-received condition having an average aspect ratio over about 50 are processed to reduce the average aspect ratio to from about 10 to about 20 and are incorporated in a concentration of from about 10 to about 20 vol. %. The sintering aid is a mixture of yttria and MgO with the yttria being provided in a concentration of from about 10 to about 2 vol. % and the MgO in a concentration of from about 0.1 to about 1 wt. %. And the sintering temperature is maintained in the range of from about 1750° to about 1800° C. The resulting composites exhibit a sintered density approaching or exceeding 94% of the theoretical density.

The invention will now be described in further detail with reference to the following detailed description in conjunction with the accompanying drawings in which.

Figure 5:
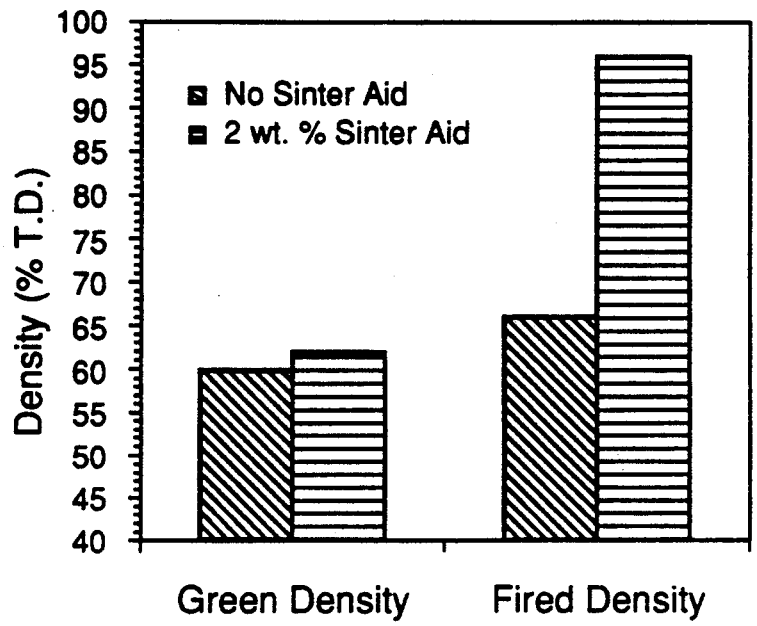
Figure 6:
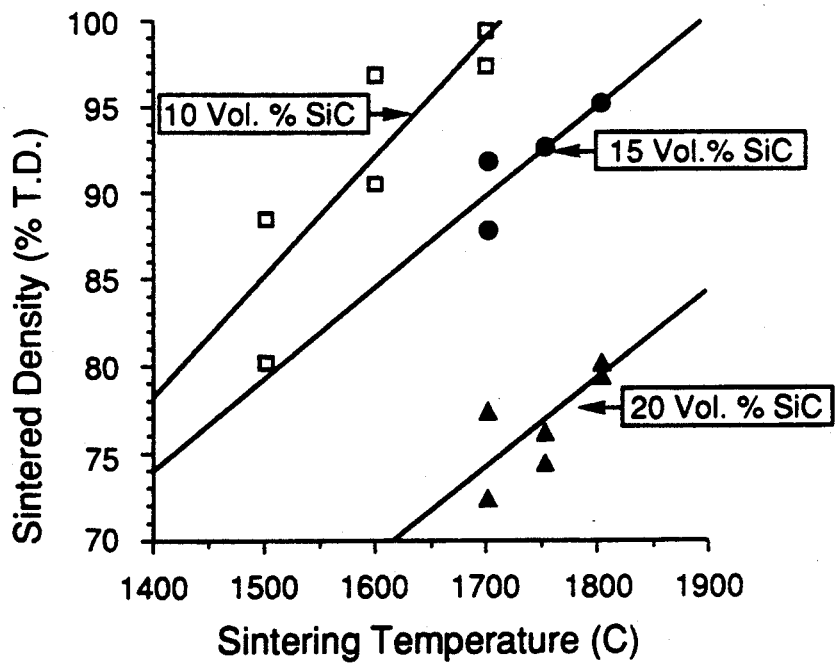

FIG. 5 is a graphical illustration showing pre-sintering and post-sintering densities as a percentage of theoretical density for mullite-10 vol. % SiC whisker composites with and without sintering aids; and FIG. 6 is a graphical illustration plotting sintering temperature versus sintered density as a percentage of theoretical density for mullite-SiC whisker composites containing various concentrations of SiC whiskers.

The method of the present invention is applicable to the production of whisker-toughened ceramic composites incorporating a ceramic matrix material such as alumina and mullite. As described in Assignee's U.S. Pat. No. 4,652,413, the alumina powder is preferably in a size range of from about 0.1 to about 1 micrometer. The particulate mullite when used as the ceramic matrix ingredient preferably is in a size range of from about 0.1 to about 3 micrometers. Mullite is a desirable constituent in certain applications since mullite-based composites have been found to exhibit lower thermal conductivities, lower coefficients of thermal expansion, lower densities, and improved thermal shock and creep resistance relative to the alumina-based forms.

The SiC whiskers are described in detail in U.S. Pat. No. 4,543,345 entitled "Silicon Carbide Whisker-Reinforced Composites and Method for Making Same", which is incorporated herein by reference. The whiskers disclosed in the aforementioned patent have a monocrystalline structure and, in the as-received form, have a diameter of about 0.6 micrometers and a length in the range of from about 10 to about 80 micrometers. The diameter of other commercially available SiC whiskers may vary from about 0.1 to about 2 micrometers and the length of the whiskers may vary from 10 to 100 micrometers. However, the SiC whiskers in all of the various commercially available forms generally have an average aspect ratio in excess of about 50 in the as-received form.

It is a feature of the invention that the average aspect ratio of the whiskers incorporated into the composites is in the range of from about 10 to about 20 to enable heretofore unachievable sintered densities in composites having up to 20 vol. % of SiC whiskers. As described more fully hereinafter, this average aspect ratio of from about 10 to about 20 is accomplished by milling the whiskers preferably with the other ingredients to thereby reduce the as-received average aspect ratio of about 50 to within the necessary range.

A particularly preferred liquid phase sintering aid is a mixture of yttria and MgO in which the yttria is incorporated within a permissible range of from about 2 to about 30% and a preferred range of from about 10 to about 30 wt. %, with a yttria concentration range of from about 10 to about 20 wt. % being the most preferred. The MgO is incorporated in a preferred range of from about 0.1 to about 2 wt. % with a concentration of about 0.5 wt. % being particularly preferred. The $Si_3N_4$ and $ZrO_2$ constituents when used as sintering aids are preferably incorporated in the range of from about 1 to about 20 wt. % and from about 1 to about 20 vol. %, respectively. The $Si_3N_4$ is most effective as a sintering aid when used with yttria in a concentration of from about 0.5 to about 5 wt. % $Si_3N_4$ and from about 2 to about 5 wt. % yttria. The $ZrO_2$, on the other hand, is most effective when used alone as a sintering aid in a concentration of from about 5 to about 20 vol. %.

In the course of preparing the composites for sintering, the constituents are blended in a suitable manner such as in an ultrasonic high-shear mixer of a suitable, commercially available type. Blending times may vary, although a duration of about 1 to 5 minutes usually provides a sufficiently homogeneous mixture. Upon completion of the blending the resulting mixture is preferably subjected to a wet milling in a ball mill operation to break up any particulate agglomerates and improve the packing efficiency of the mixture.

The present invention departs from known prior processes in that the milling is carried out for up to 32 hours and preferably in the range of from about 16 to 32 hours. That is, in the prior processes milling durations of from about 0.5 to about 8 hours maximum have been practiced in order to lower the size distribution of the SiC whiskers and improve their packing efficiency for providing a final product with the desired high density and fracture toughness. It was believed that composites with whisker concentrations exceeding about 10 vol. % could not be sintered to produce acceptable densities without pressure assistance, regardless of the extent to which the ingredients were milled. However, it has been discovered in accordance with the present invention that milling the SiC whiskers sufficient to achieve an average aspect ratio of from about 10 to about 20 enables the production of composites exhibiting significantly improved sintered densities to permit the fabrication of relatively complex shapes containing an increased concentration of SiC whiskers and thus improved fracture toughness. Preferably, then, the SiC whiskers are incorporated in a concentration of about 20 vol. and the whiskers are milled for at least about 16 hours to reduce the average aspect ratio to from about 10 to about 20.

Depending on the condition of the matrix material and sintering aid it may be desirable to mill these constituents separately prior to the admixture of the SiC whiskers, such as where the constituents appear to contain substantial particulate agglomerates, clumps and the like. The as-received SiC whiskers are then added and the mixture milled for an appropriate length of time to achieve an aspect ratio of the whiskers in the range of from about 10 to 20.

Once the mixture is blended and homogenized as a result of the milling process and the necessary aspect ratio of the SiC whiskers is achieved, the dried mixture is placed in a suitable mold or other shape forming mechanism and subjected to a pressure of from about 10,000 to about 60,000 psi to achieve a "green" density in the neighborhood of 50% of the theoretical density. The pressed powder compact is then placed on a suitable support compatible with the expected sintering temperatures, and at this time may be covered with an excess SiC whiskers or SiC powder to promote sintering of the composite. The loaded support is then placed in a suitable furnace and heated in an atmosphere of inert gas such as argon or nitrogen to a temperature sufficient to effect pressureless liquid-phase sintering of the particulates defining the matrix containing the dispersed SiC whiskers. The sintering temperature is preferably in the range of from about 1700° to about 1850° C., and is most preferably about 1800° C. for assuring sintering uniformity. It is preferred that the compact be heated at a relatively rapid rate in the order of about 90 minutes from room temperature to about 1000° C. and then at a slightly slower rate in the order of about 60 minutes from about 1000° C. to 1800° C. The compact is then exposed to the final temperature for a hold time of from about 1 to about 30 minutes to effect complete sintering.

The pressureless sintering process is effective to provide a self-supporting structure of the sintered ceramic in a relatively complicated geometry and containing an increased SiC whisker concentration of up to 20 vol. % with the composite exhibiting significantly improved sintered densities over prior composites produced by pressureless sintering and containing corresponding concentrations of SiC whiskers. In particular, it is found that by maintaining the aspect ratio of the SiC whiskers in the range of about 10 to about 20 as aforesaid that pressureless sintered densities of at least about 94% of the theoretical density are achieved for 20 vol. % SiC whisker composites when the sintering aid is a mixture of yttria and MgO in a concentration of from about 10 to about 20 wt. % and about 0.5 wt. %, respectively, effective to achieve an appropriate amount of a liquid phase to promote the sintering process. Previously reported work showed a maximum obtainable sintered density equal to no greater than about 75% of the theoretical density for pressureless sintered composites incorporating 20 vol. % SiC whiskers.

The sintered composites produced by the invention exhibiting improved densities including the particularly desirable density level of at least about 94% of theoretical may be suitable for some uses without the need of further densification treatments. Such uses include cutting tools, wear parts and heat engine components. However, in some instances it may be necessary to further densify the composite to achieve a density of about 98% or greater of theoretical density. In such cases, the composite may be subjected to hot isostatic pressing in an inert atmosphere at a temperature in the range of from about 1600° to about 1700° C. and a pressure loading in the range of from about 10,000 to about 30,000 psi. It is noted that the hot isostatic pressing operation can be achieved without encapsulating the composite since the composite possess sufficient structural integrity as a result of the previous pressureless sintering step to withstand the hot isostatic pressing operation. Normally, the hot isostatic pressing step is carried out over a duration of from about 0.1 to about 1 hour to produce a final density of at least about 98% of the theoretical density.

The following examples further illustrate the invention and are not to be considered as placing any limitations thereon.

EXAMPLE I

Figure 1:
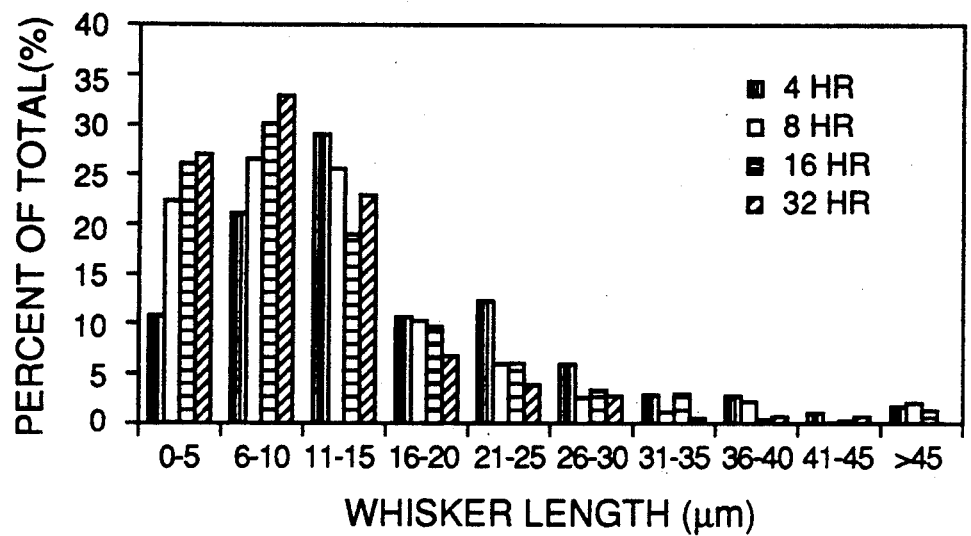
FIG. 1 is a graphical illustration showing SiC whisker length distribution for various milling durations.

Alumina based composites containing 20 vol. % SiC whiskers, 0.5 wt. % MgO and 2 wt. % yttria are prepared by blending the alumina, MgO, and yttria for 3 minutes and then ball milling the mixture for about 16 hours. The SiC whiskers which have an as-received average aspect ratio of about 50 are then added and separate portions are milled for 4, 8, 16 and 32 hours. The resulting whisker length distribution obtained by the milling procedure is illustrated in FIG. 1 which shows considerable reduction in the whisker length during milling. Specifically, for a milling duration of 4 hours the average aspect ratio of the whiskers is about 25. After 8 hours, the average aspect ratio is reduced to just above about 20 and after 16 hours the average aspect ratio drops below about 20 to an average of about 18. Milling for a total of 32 hours reduces the average aspect ratio to about 17.

Figure 2:
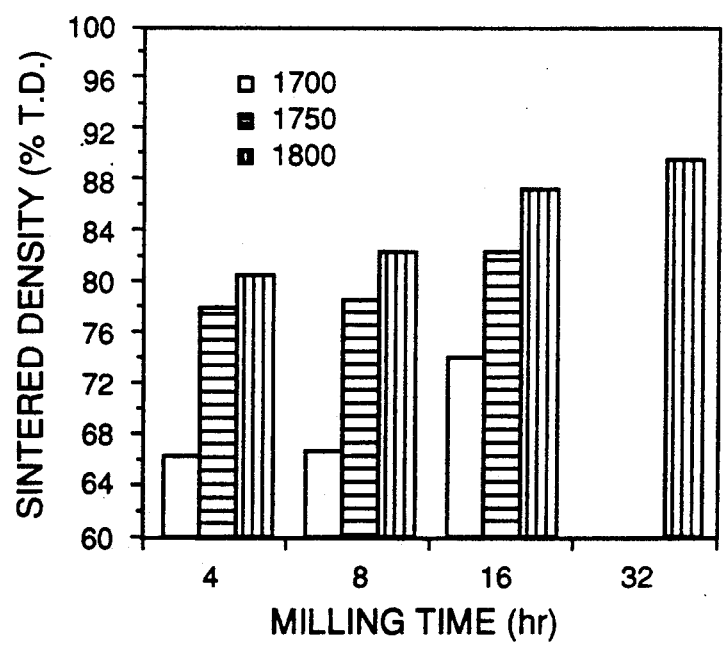
FIG. 2 is a graphical illustration showing sintered densities as a percentage of theoretical density for ceramic composites incorporating 20 vol. % SiC whiskers with different aspect ratios.

After the milling procedure is completed, the dried powder mixtures are pressed at about 200 Mpa for a duration of 1 minute to produce composites having a green density of from about 55 to about 65% of theoretical density. Separate samples from each portion are then heated at atmospheric pressure in a graphite-element furnace under argon gas at 1700°, 1800° and 1850° C. FIG. 2 shows the dramatic improvement in sintered density as a percentage of the theoretical density as the aspect ratio is lowered to from about 10 to about 20 for the alumina composites including 20 vol. % SiC whiskers.

EXAMPLE II

Alumina-SiC whisker composites are prepared as described in Example I except that the yttria content is varied between 2 and 30 wt. % with the MgO concentration being held constant at 0.5 wt. %. A portion of the samples containing 2 wt. % yttria are milled 16 hours following addition of the SiC whiskers. All other samples are milled 32 hours after the SiC whiskers are added. The samples are heated at temperatures of from 1700° to 1850° C. to produce composites having sintered densities as a percentage of theoretical density (T.D.) as shown in Table I below. It is noted that the 2 wt. % yttria samples milled 16 hours were heated only at 1700° and 1800° C. and that the remaining 2 wt. % yttria samples that were milled 32 hours were heated at 1750° C.

TABLE I

| Wt. % $Y_2O_3$ | Sintering Temp. | % T.D. | Calculated % Liquid |
|---|---|---|---|
| 2 | 1700 | 74.5 | 4 |
| 10 | 1700 | 90.0 | 21 |
| 20 | 1700 | 94.3 | 40 |
| 30 | 1700 | 96.0 | 58 |
| 2 | 1750 | 84.3 | 5 |
| 5 | 1750 | 92.5 | |
| 10 | 1750 | 94.1 | 23 |
| 20 | 1750 | 93.3 | 45 |
| 30 | 1750 | 92.3 | 65 |
| 2 | 1800 | 82.7 | 6 |
| 10 | 1800 | 93.5 | 28 |
| 20 | 1800 | 92.0 | 54 |
| 30 | 1800 | 90.0 | 78 |
| 2 | 1850 | 89.7 | |

Figure 3:
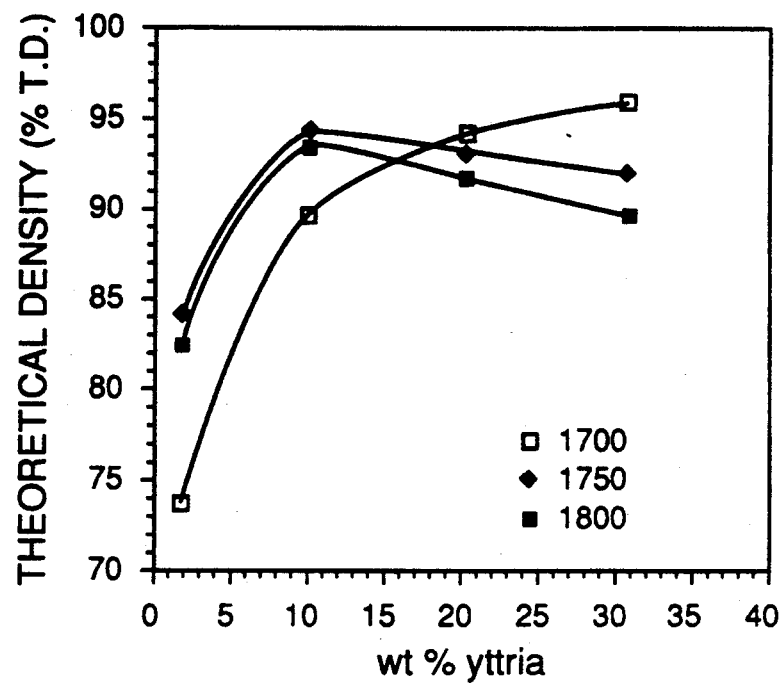
FIG. 3 is a graphical illustration plotting yttria content versus sintered density as a percentage of theoretical density for 20 vol. % SiC whisker ceramic composites at various sintering temperatures.
Figure 4:
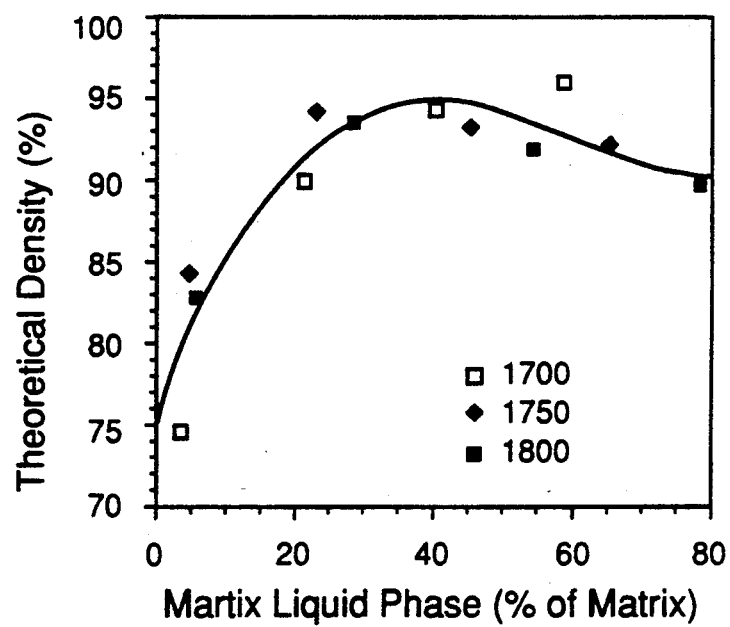
FIG. 4 is a graphical illustration plotting percent liquid phase versus sintered density as a percentage of theoretical density for 20 vol. % SiC whisker composites at various sintering temperatures.

Data from Table I is reproduced onto the graph of FIG. 3 for samples containing from about 2 to about 30% yttria and heated at temperatures of 1700°, 1750° and 1800° C. FIG. 3 shows that the sintered densities generally increase with both temperature and yttria content up to about 10 vol. yttria for sintering temperatures of 1750° and 1800° C. and that sintered densities at a sintering temperature of 1700° C. increase steadily with increasing yttria content. At temperatures equal to or greater than 1750° C. and for yttria contents greater than about 10 wt. % the densities are observed to decrease slightly as the yttria content is increased. This effect is believed to be due to excessive liquid phase formation at higher yttria contents and higher temperatures leading to increased decomposition and volatilization of gaseous species. This is illustrated in FIG. 4 which compares the % liquid phase versus sintered density at the temperatures and yttria contents shown in Table I and depicted in FIG. 3. From FIG. 4 it is seen that densities do not generally improve with liquid phase contents greater than about 30 to 40%. From FIG. 3 it is seen that sintered densities approaching or exceeding about 94% of the theoretical density are achieved with yttria concentrations in the range of from about 10 to about 20 wt.

EXAMPLE III

A sample is prepared containing alumina, 20 vol. % SiC whiskers and 12 vol. % $ZrO_2$. The alumina and $ZrO_2$ are ball milled for 16 hours prior to addition of the SiC whiskers after which the mixture is ball milled for an additional 4 hours. The milled mixture is dried and then pressed at 380 Mpa to a green density of about 55% of theoretical density, and is then heated at atmospheric pressure under nitrogen at 1700° C. The fired composite has a density of about 90% of the theoretical density.

EXAMPLE IV

Samples are prepared containing mullite, SiC whiskers and in some cases yttria and MgO as sintering aids. In a first group of samples the composites incorporate 10 vol. % SiC whiskers. Half of the samples contain 2 wt. % yttria and 0.5 wt. % MgO as sintering aids. The other samples contain no sintering aid. In preparing the samples, the mullite and, when present, the sintering aids, are all ball milled for 24 hours prior to admixture of the SiC whiskers after which the mixture is milled an additional 16 hours. The resulting dried mixtures are pressed at 200 Mpa for 1 minute and the resulting density is measured as the green density. The samples are then heated at atmospheric pressure an argon atmosphere at 1600° C. The results are depicted in FIG. 5 which shows that the sintered density of the mulltie-10 vol. % SiC whisker composites exceed 95% of theoretical upon addition of the sintering aids.

In the second group of mullite samples, a sintering aid is incorporated consisting of 2 wt. % yttria and 0.5 wt. % MgO. The SiC whisker content is varied to produce mullite composites having 10, 15 and 20 vol. % SiC whiskers. The mullite and sintering aid is pre-milled for 24 hours prior to admixture of the SiC whiskers after which the mixture is ball milled an additional 16 hours. The dried mixtures are pressed at 200 Mpa to a green density of from about 55 to about 65% of the theoretical density and then heated under argon gas at atmospheric pressure at temperatures of 1500°, 1600°, 1700°, 1750° and 1800° C. The results are shown in FIG. 6.

It is observed from FIG. 6 that the sintered density for mullite composites decreases with increasing whisker content and that for all whisker concentrations the sintered density generally increases with the sintering temperature. The best sintered densities are achieved in the mullite composites containing 10 vol. % SiC whiskers which are sintered at temperatures of from about 1600° to about 1700° C.

EXAMPLE V

Two alumina composites are prepared, the first consisting of alumina together with 10 vol. % SiC whiskers and 2 wt. % yttria, and the second being identical to the first except for the addition of 2 wt. % $Si_3N_4$. For each sample, all of the constituents except the whiskers are ball milled for 16 hours before admixture of the SiC whiskers, after which the resulting mixture is milled an additional 8 hours. Compacts of each sample are pressed at 380 Mpa for an appropriate time to achieve a green density of 58% of the theoretical density, followed by heating at 1700° C. in a nitrogen atmosphere at atmospheric pressure. The fired densities are 88.2% of theoretical density and 93.1% of the theoretical density, respectively.

What is claimed is:

1. The method of producing whisker-toughened ceramic composites from alumina, SiC whiskers having an aspect ratio of at least about 50, and a sintering aid including yttria and MgO, which comprises forming a homogeneous mixture including from about 10 to about 20 wt. % of the SiC whiskers, a yttria concentration of from about 10 to about 40 wt. %, a MgO concentration of from about 0.1 to about 1 wt. %, and a balance of alumina; milling said homogeneous mixture for a period of 16 to 32 hours to achieve an average aspect ratio of the whiskers of from about 10 to about 20; shaping the mixture into a preselected configuration at a pressed density of about 50% of the theoretical density; and heating the mixture at essentially atmospheric pressure in an inert atmosphere at a temperature in the range of from about 1750° to about 1800° C. for a sufficient time to effect liquid-phase pressureless sintering of the ceramic matrix wherein a sintered self-supporting composite of the predetermined configuration is produced which is toughened by a dispersed whisker phase and which exhibits an improved sintered density of at least about 94% of the theoretical density.

2. The method according to claim 1, wherein the average aspect ratio of the whiskers is reduced and the homogeneous mixture is formed by adding the whiskers to a mixture of the alumina and the sintering aid, and then milling the whiskers together with the alumina and sintering aid under conditions sufficient to achieve an average aspect ratio of the whiskers of from about 10 to about 20.

3. The method of preparing SiC whisker toughened ceramic composites comprising: forming a homogeneous mixture including about 10 vol. % to about 20 vol. % SiC whiskers having an average as-received aspect ratio of greater than about 50, a sintering aid selected from the class containing of $Y_2O_3$, MgO, $ZrO_2$, $Si_3N_4$, and mixtures thereof in a concentration sufficient to promote liquid phase sintering, and a ceramic matrix material selected from the group alumina and mullite; milling said mixture for a period of 16 to 32 hours to achieve an average aspect ratio of said SiC whiskers of less than 20; shaping said homogeneous mixture into a preselected configuration at a pressed density of about one-half the theoretical density; and heating the shaped mixture at essentially atmospheric pressure in an inert atmosphere to a temperature sufficient to effect liquid-phase sintering to provide a self-supporting composite of the ceramic matrix material toughened by a dispersed whisker phase therein with the composite exhibiting an improved sintered density over previous composites produced by pressureless sintering containing corresponding concentrations of SiC whiskers.

4. The method of claim 3 wherein the sintering aid is a mixture of $Y_2O_3$ and MgO provided in a concentration of from about 10 to about 40 wt. % $Y_2O_3$ and from about 0.1 to about 1 wt. % MgO.

5. The method of claim 3 wherein the sintered density is at least about 94% of theoretical density.

6. The method of claim 3 wherein the sintering temperature is from about 1700° to about 1850° C.

7. The method of claim 3 wherein the sintering temperature is from about 1750° to about 1800° C.

* * * * *